J. R. Cross.
Skipping Rope.
Nº 85,514.    Patented Jan. 5, 1869.
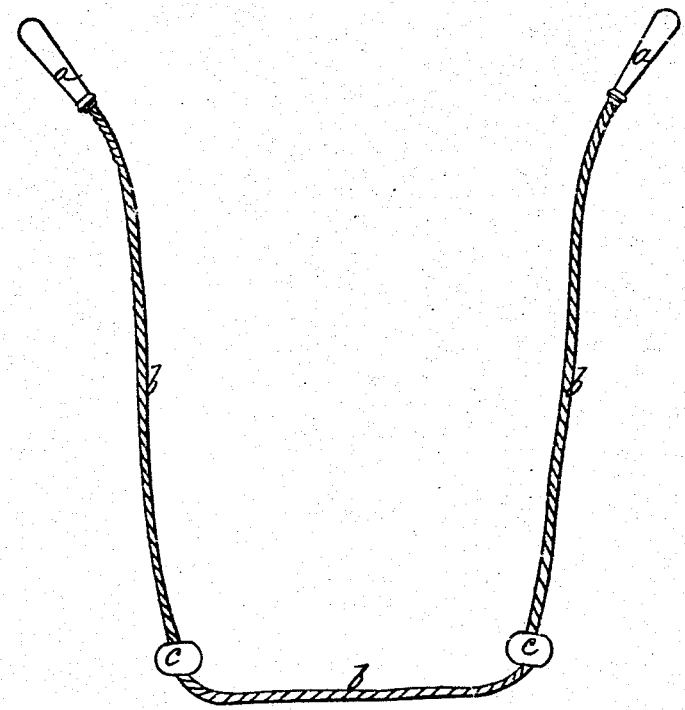
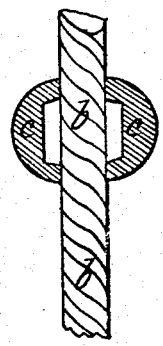
Witnesses;
F W Wolf
Hamon Felsenthal
Inventor;
Jhn R. Cross

UNITED STATES PATENT OFFICE.

JOHN R. CROSS, OF CHICAGO, ILLINOIS.

IMPROVED SKIPPING-ROPE.

Specification forming part of Letters Patent No. 85,514, dated January 5, 1869; antedated December 19, 1868.

*To all whom it may concern:*

Be it known that I, JOHN R. CROSS, a citizen of the United States, of the city of Chicago, in the State of Illinois, have invented certain new and useful Improvements in Making an Improved Skipping-Rope, for the amusement and exercise of children or grown persons, whereby a uniform motion is communicated to the skipping-rope by the use of india-rubber, wood, ivory, bone, glass, or lead balls attached to the rope at such distances from the handles (which are attached to each end of the skipping-rope) as shall, by their weight, cause the middle section of the skipping-rope to assume a horizontal position when in motion, so that the skirts of girls will not strike or rub against the two lateral sections of the rope, as shown in the accompanying drawing herewith submitted, and forming a part of this specification.

$a\ a$ represent the handles. $b\ b\ b$ represent the several sections of the skipping-rope; $c\ c$, the balls, secured in any convenient manner, so as to be easily moved to a point near to or remote from the handles, as may be required, and finally fastened in the position desired.

I think the best method is a rubber ball, of sufficient size to give the proper weight, with a hole small enough to admit the rope and clasp it firmly at the desired point.

Having described the nature and construction of my invention, I will now specify what I claim and desire to secure by Letters Patent—

I claim the combination of balls $c\ c$ with a skipping-rope, arranged to operate in the manner specified, for the purpose of causing said rope to assume a substantially rectangular form when in motion, by forming angles in the rope at the points where the balls or weights are attached, substantially as and for the purposes set forth.

JOHN R. CROSS.

Witnesses:
J. M. MARSHALL,
E. T. CLACKET.